Figure 1:
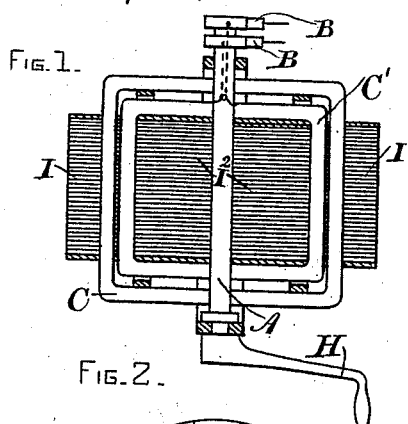

(No Model.)

E. THOMSON.
REACTIVE COIL.

No. 508,657. Patented Nov. 14, 1893.

Witnesses—
Alec F. Macdonald
A. C. Orne

Inventor—
Elihu Thomson
By Bentley & Blodgett
Attys.

THE NATIONAL LITHOGRAPHING COMPANY,
WASHINGTON, D. C.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

REACTIVE COIL.

SPECIFICATION forming part of Letters Patent No. 508,657, dated November 14, 1893.

Application filed February 15, 1892. Serial No. 421,500. (No model.)

*To all whom it may concern:*

Be it known that I, ELIHU THOMSON, a citizen of the United States, residing at Swampscott, in the county of Essex and State of Massachusetts, have invented certain new and useful Improvements in Reactive Coils, of which the following is a specification.

The present invention relates to an improvement in reactive coils for the control of alternating electric currents. In its simplest form it is well adapted for use on the common alternating circuit, as has already been described in Patent No. 465,078, granted me December 15, 1891, but certain special forms have been designed particularly with a view to controlling multiphase currents, such for example, as currents of three phases, for which I now make application for Letters Patent. Such reactive coils are useful when electric currents of the kind mentioned are used for driving motors, and when it is required to regulate the strength of such currents, as on starting or modifying the speed of the motors. When three phase motors are used for traction purposes these coils will take the place and serve the purpose of rheostats. Another application for their use is for varying the brilliancy of electric lights fed by the three phase system of currents.

The elements of the present reactive apparatus are, briefly considered, a magnetic core or mass, preferably arranged so as to form a complete magnetic circuit, and two or more coils placed in inductive relation thereto, and adjustable angularly with reference to one another, so that they may either lie parallel or stand at any desired angle to one another. For this purpose one of the coils is preferably stationary, and the other movable around a central axis so that it may turn through an arc of one hundred and eighty degrees, and assume any desired angle to the stationary coil. It will be understood in the arrangement described, as is shown in my former patent, that each coil will have an influence upon the magnetic circuit passing through the core, the resultant intensity of which will vary according to the relative positions of the different coils. In this application I describe a switch for automatically cutting the coils from circuit when they stand in such position that their counter magnetizing effect is at its maximum, and hence their reactive effect opposing the line electro-motive force at a minimum, and I also show how multiphase currents can be regulated by including in each branch of the system a coil, which coils co-operate with adjustable coils arranged and controlled so that the reactive effect in each branch of the circuit is varied simultaneously and to a like extent, thereby securing uniform regulation throughout the entire system, and guarding against displacement of phase in the different branches, which would interfere with the proper working of the translating devices.

Figure 2:
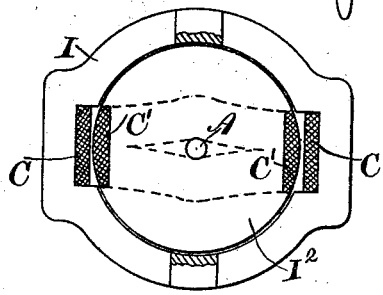
Figure 3:
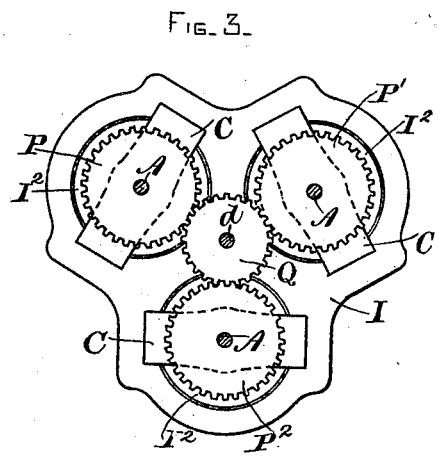

In the accompanying drawings Figure 1 is a sectional view of the reactive coils forming part of my invention. Fig. 2 is a top view partly in section of the same. Fig. 3 represents a top or bottom view of the invention as adapted to regulate a multiphase circuit of the three-phase type, and Fig. 4 illustrates diagrammatically certain means for cutting out the reactive coils at such times as no substantial reactive effect is desired.

In Fig. 1, I represents a laminated outer ring or frame provided with diametrically opposite grooves on its inner sides within which is fitted a coil C. Within this outer frame and coil is a laminated iron core or mass $I^2$, preferably circular in cross section, and having wound upon it diametrically, as shown, a second coil C', the terminals of which are carried to rings upon which rest brushes B, B, for completing the circuit of the coil. The iron masses fit fairly close, forming a complete magnetic circuit through the coils, but nevertheless the two coils must be adjustable relatively to one another, which is accomplished by mounting the core $I^2$ on a central axis A, so that the core and the internal coil C', which fits a groove in the core, may be revolved through any desired angle. To rotate the core, a handle H may be provided on the central shaft, and there may be also added means for holding it in any desired position. If now, the two coils be included in the circuit to be regulated either in series or multiple arc, and if they be wound in the same direction, their effects on the magnetic circuit when standing parallel, as in Fig. 2, are cumulative, and the reactive effect upon the line electro-motive force due thereto, will be at its maximum. If now the inner coil be moved so as to stand at an angle to the stationary coil, the two will oppose one another, and this opposition will become greater the farther from parallelism the coils are placed, until finally, when a complete half turn has been made, the reactive effect will be practically nullified, and only the resistance of the coils will oppose the flow of current therethrough.

When dealing with multiphase currents it is necessary to arrange the apparatus in such manner that each of the branches or lines of the entire system may be regulated to a like extent, lest the current phases be displaced. Means for doing this are shown in Fig. 3. Here the outer iron frame I, is provided with three circular openings, in which are fitted stationary coils, C, C, C, and adjustable cores $I^2, I^2, I^2$, provided with coils wound thereon in all respects similar to Fig. 2. It constitutes, in fact, three devices adapted to be coupled up respectively in circuit with the three lines of a three phase system, and to regulate such system in precisely the manner already described. It is however essential that the different moving coils be connected together, so that a movement of one may impart a corresponding movement to the others, and thereby insure like regulating effects in each branch of the circuit. As shown in Fig. 3, this is accomplished by mounting gear wheels P, P', $P^2$, on the shafts A, which are themselves so arranged that all these gear wheels will mesh with a central pinion Q, journaled on a stud $d$. If now, any one of the rotating cores, or the central pinion, be moved, a like effect will be felt in all three of the circuits.

Figure 4:
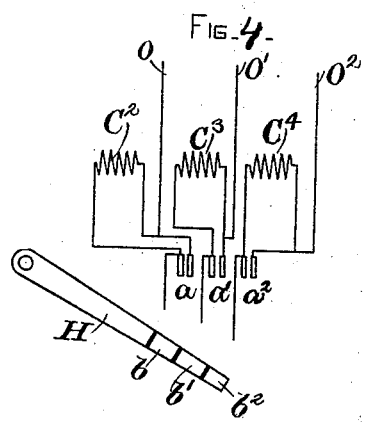

It is desirable sometimes to shunt the coils when the minimum reactive effect upon the circuit is desired, and means for doing this are shown in Fig. 4. Here $C^2, C^3, C^4$, represent respectively the coils present in the different reactive devices used in a three-phase system, O, O', $O^2$, representing the different branches of the system. These coils have their terminals connected to pairs of contacts $a, a', a^2$, so that each is shunted when its contacts are bridged. This short-circuiting of the coils is effected by arranging on the handle H insulated contacts $b, b', b^2$, so arranged that, when the handle is in such a position as to cause the reactive devices to have their least reactive effect, the contacts on the handle engage and connect the coil terminals, shunting the coils entirely and removing their resistance from circuit.

The switch of course may be constructed in various ways and used with reactive devices of varying character and irrespective of the circuit regulated.

What I claim as new, and desire to secure by Letters Patent, is—

1. The combination of a reactive coil or device comprising two or more coils adjustable angularly with relation to one another, to vary the intensity of a resultant magnetic field, with a switch arranged to cut from circuit, or short circuit, said coils automatically when placed in the position of minimum reactive effect, as set forth.

2. The combination of a regulable reactive coil or device in each branch of a multi-phase circuit, with means for varying simultaneously, and to a like amount, the reactive effects of such different coils, and a switch for cutting from circuit or short-circuiting said coils when adjusted to give substantially the minimum reactive effect, as set forth.

3. An alternating current regulating device, consisting of two or more coils inductively related to a common magnetic core or mass, means for adjusting such coils angularly with reference to one another to vary the reactive effect, and a switch for automatically cutting from circuit or shunting said coils, when placed in the position of minimum reaction, as described.

In witness whereof I have hereunto set my hand this 12th day of February, 1892.

ELIHU THOMSON.

Witnesses:
 JOHN W. GIBBONEY,
 BENJAMIN B. HULL.